United States Patent [19]

Watanabe

[11] Patent Number: 5,679,939
[45] Date of Patent: Oct. 21, 1997

[54] IC CARD FOR OUTPUTTING NOTIFICATION OF A TRANSACTION BY VOICE

[75] Inventor: Kohichi Watanabe, Tokyo, Japan

[73] Assignee: NEC Corporation, Tokyo, Japan

[21] Appl. No.: 500,329

[22] Filed: Jul. 10, 1995

[30] Foreign Application Priority Data

Jul. 11, 1994 [JP] Japan ................. 6-180503

[51] Int. Cl.$^6$ ................................. G06F 15/30
[52] U.S. Cl. .................. 235/379; 235/492; 902/8
[58] Field of Search ......................... 235/379, 380, 235/382, 492; 902/8

[56] References Cited

U.S. PATENT DOCUMENTS

| | | | |
|---|---|---|---|
| 4,614,144 | 9/1986 | Sagara et al. | 235/492 X |
| 4,760,245 | 7/1988 | Fukaya | 235/379 |
| 4,851,654 | 7/1989 | Nitta | 235/492 |
| 4,961,229 | 10/1990 | Takahashi | 235/380 X |
| 5,272,319 | 12/1993 | Rey | 235/379 |
| 5,337,346 | 8/1994 | Uchikura | 379/58 |

FOREIGN PATENT DOCUMENTS 3-42297   2/1991   Japan .

*Primary Examiner*—Donald T. Hajec
*Assistant Examiner*—Karl D. Frech
*Attorney, Agent, or Firm*—Foley & Lardner

[57] ABSTRACT

An IC card with display and input functions is provided which can notify the user of the card by voice to remind him of scheduled matters which are registered into the card, just by the depression of a predetermined key. The IC card has, on the front face, a keyboard display which serves as a display device and an inputting device, and has a voice outputting piezoelectric element of a very small size embedded in the rear face thereof. When the IC card is used with an ATM, reception and disbursement information are displayed on the display section when the user depresses a key. Further, just by depressing the one-touch key, the user of the card can receive notification of necessary operations with the ATM by voice.

6 Claims, 5 Drawing Sheets

FIG. 2(A)
(PRIOR ART)

| ON/OFF | | | | | HISTORY INQUIRY | |
|---|---|---|---|---|---|---|
| CE/C | 7 | 8 | 9 | ÷ | MENU | |
| | 4 | 5 | 6 | X | QUIT | |
| | 1 | 2 | 3 | — | △ | |
| | 0 | • | = | + | ▽ | |

FIG. 2(B)
(PRIOR ART)

| ON/OFF | HISTORY INQUIRY | |
|---|---|---|
| | 94. 1. 5 RECEPT. | 20.000 |
| | 94. 1.30 TRANS. | 100.000 |
| | 94. 1.30 DISBURS. | 50.000 |
| | BALANCE | 1,234.000 |
| MENU | ↵ PRECED PAGE / NEXT PAGE | △ ▽ |

IC CARD FOR OUTPUTTING NOTIFICATION OF A TRANSACTION BY VOICE

BACKGROUND OF INVENTION

1. Field of the Invention

This invention relates to an IC card, and more particularly to an IC card which has a display function and an input function.

2. Description of the Related Art

Conventionally, some IC cards of the type mentioned above, which are used with an automatic teller machine, are used in such a manner that transaction data and other necessary data are written into the IC card from the automatic teller machine side and then displayed on a display provided on the IC card so as to show the data to the user of the IC card.

Thus, an IC card with a keyboard display 32, on which is displayed a keyboard touch panel for the entire area of a face of IC card 31 to improve operability in inputting by employing a keyboard of an increased size and a display area of an increased size has been proposed, such as in Japanese Patent Laid-Open Application No. Heisei 3-42297 as shown in FIG. 1. This document discloses several constructions of the IC card wherein various data information can be displayed on the large display area.

FIGS. 2(A) and 2(B) are diagrammatic views illustrating a process of variation of the input display of IC card 31. For example, if the MENU key of IC card 31 is depressed once, then a balance inquiry is displayed, and if the MENU key is depressed twice, then a cash transaction history inquiry such as shown in FIG. 2(A) is displayed on display face 2. Then, if a YES key is depressed (not shown in FIG. 2(A)), then a mass data display image plane such as shown in FIG. 2(B) is displayed. When the data are displayed, the key switches of the touch panel are erased. However, key switch inputting section 3, which is necessary for operation of the image plane, still remains displayed on display face 2.

In this manner, conventional IC cards with a keyboard display have exhibited remarkable improvement in inputting operation and displaying method, and data can be displayed and inputted in detail using the present technique. However, the conventional IC cards are disadvantageous in that, for example, when transfer is required or when funds are insufficient and the due date is approaching, to much time is required for retrieval and also operations of the keys are complicated if the user tries to obtain such information.

SUMMARY OF THE INVENTION

It is the first object the present invention to provide an IC card which while eliminating the disadvantages of conventional IC cards with the display and input functions described above, makes complicated operations of keys unnecessary and can notify the user of the card, for example, by voice to remind him of scheduled matters registered into the card, just by the depression of a predetermined key.

The second object of the present invention is to provide an IC card with a display function and an input function further comprising a keyboard display on the first face which has a voice outputting element for outputting the notification by voice on the other face.

The third object of the present invention is to provide an IC card with a display function and an input function further comprising, on the first face, a voice notification key which activates a notification by voice when the key face is depressed.

The fourth object of the present invention is to provide an IC card with a display function and an input function further comprising means for audio response data, inputted by means of said keyboard for an arbitrarily designated date.

The fifth object of the present invention is to provide an IC card with a display function and an input function further comprising means for calculating, in response to the amount of an automatic payment on a predetermined date, and outputting, when the funds are short, the amount such shortage by voice.

Other and further objects, features and advantages of invention will appear more fully from the following description.

BRIEF DESCRIPTION OF DRAWINGS

FIGS. 2(A) and 2(B) are diagrammatic views illustrating a displaying process of the conventional IC card shown in FIG. 1, and wherein FIG. 2(A) shows a display face when a history inquiry is requested and FIG. 2(B) shows the display face which displays details of the history;

DESCRIPTION OF THE PREFERRED EMBODIMENT

Figure 1:
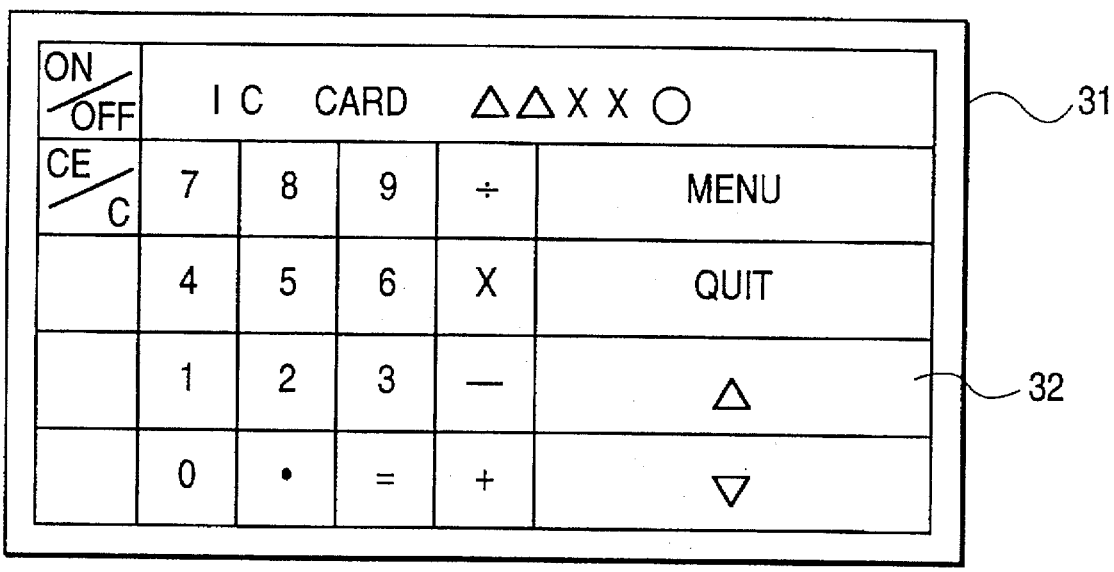
FIG. 1 is a plan view of a conventional IC card with a display function and an input function.
Figure 3A:
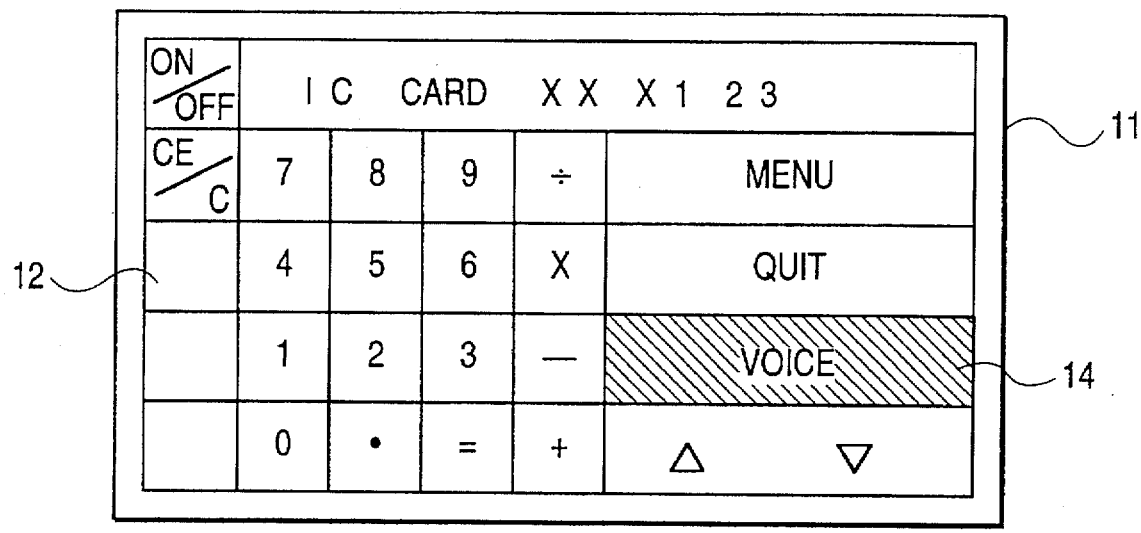
FIG. 3(A) is a view of a front face of an embodiment of an IC card with a display function and an input function of the present invention which provides a notification by voice.
Figure 3B:
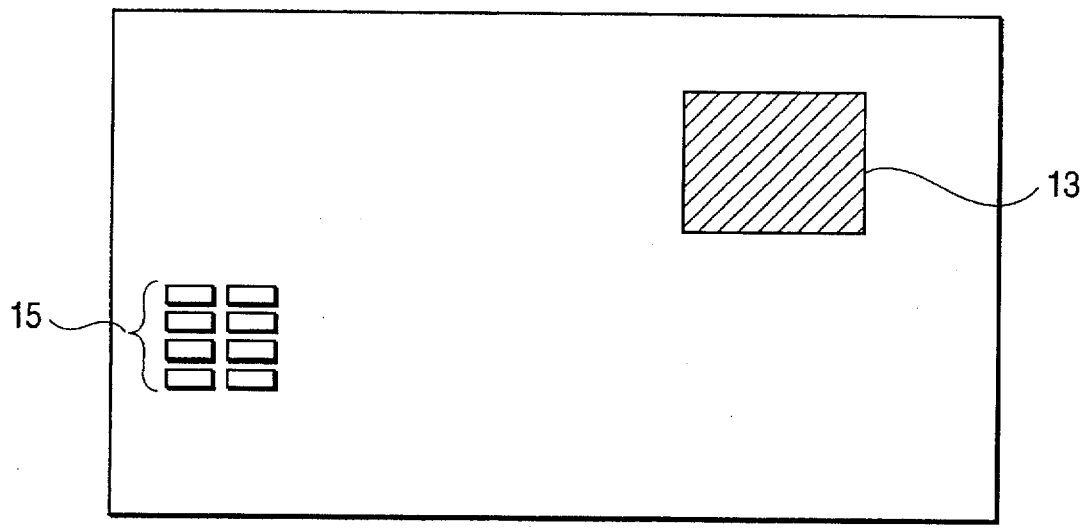
FIG. 3(B) is a view of a rear face of the IC card.

FIG. 3(A) is a view of a front face of an embodiment of an IC card with a display function and an input function of the present invention which can provide a notification by voice, and FIG. 3(B) is a view of a rear face of the IC card.

IC card 11 has a front face displaying keyboard display 12 on which a keyboard for inputting is displayed over the entire area. Voice outputting piezoelectric element 13 for outputting a notification voice is embedded in the rear face of the IC card 11.

The keyboard display 12 has voice notification key (VOICE) 14 which outputs operation guidance by voice when the key is depressed once.

It is to be noted that, while, on the front face of the IC card 11 shown in FIG. 3(A), functions of an electronic calculator, a menu selection key (MENU), a quitting key (QUIT) and some other keys are displayed and a display indication is displayed on the keyboard display 12, they are only for illustration, and the present invention is not limited to the specific arrangement or form of those elements.

The IC card 11 has contact set 15 as an external interface on the rear face thereof.

Figure 4:
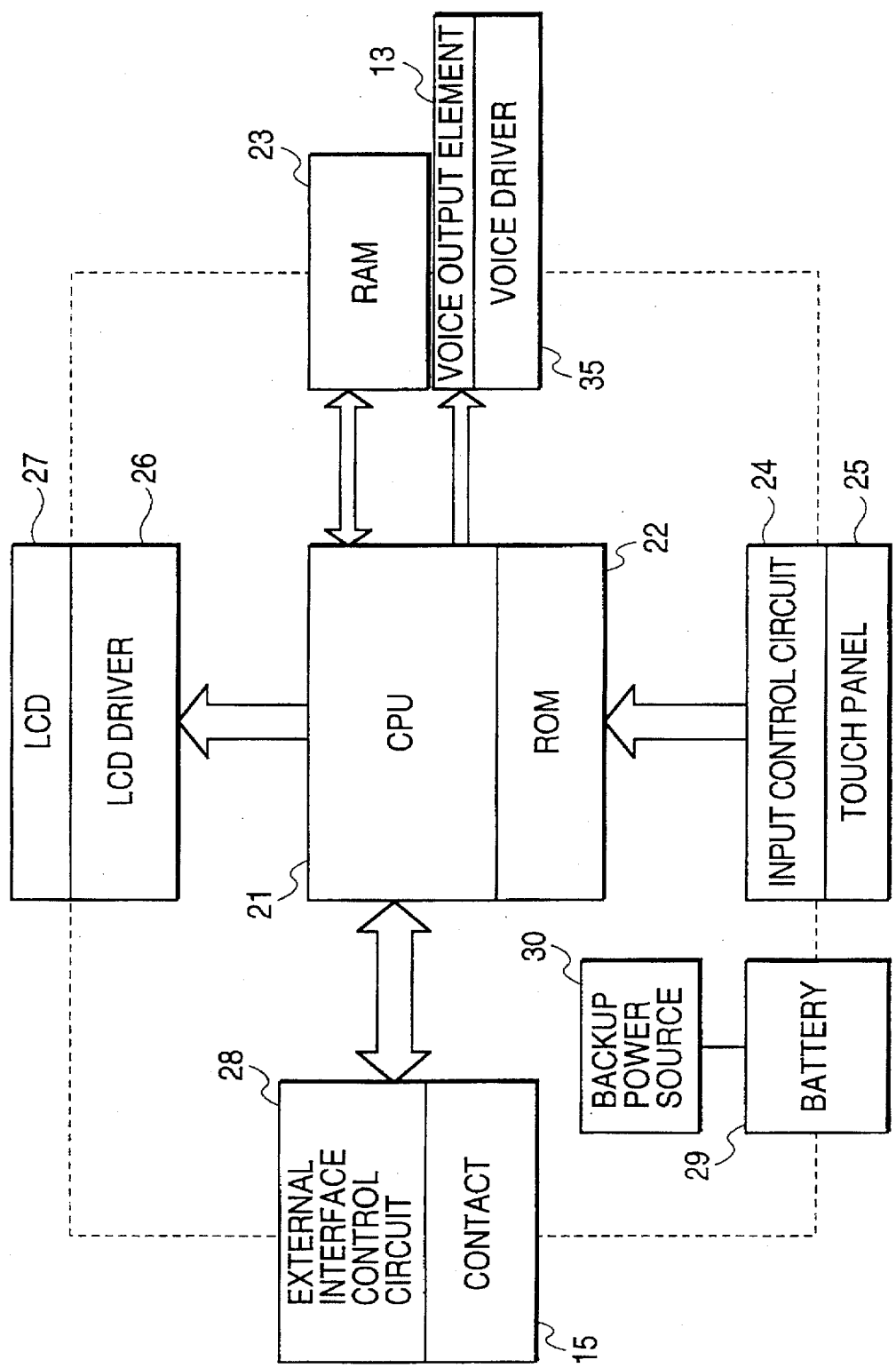
FIG. 4 is a circuit diagram of a control circuit of the IC card shown in FIGS. 3(A) and 3(B)

A control circuit of the embodiment of the present invention is shown in FIG. 4.

Referring to FIG. 4, the control circuit includes central processing unit (CPU) 21 which performs inputting, calculation, editing, data processing with outside and control processing, read-only memory (ROM) 22 in which a control program for CPU 21 is stored, random-access memory (RAM) 23 for storing data, touch-panel inputting control circuit 24, touch-panel 25, liquid crystal display (LCD) 27, external interface control circuit 28 for an automatic teller machine (ATM), the external contact set 15 for an automatic teller machine, battery 29 for driving the IC card, and super-capacitor 30 serving as backup power source for memory protection, as well as voice driver 35 and the voice outputting element 13. Here, the battery 29 may be a solar cell.

Further, the IC card according to the present invention can be used with an ATM.

Figure 5:
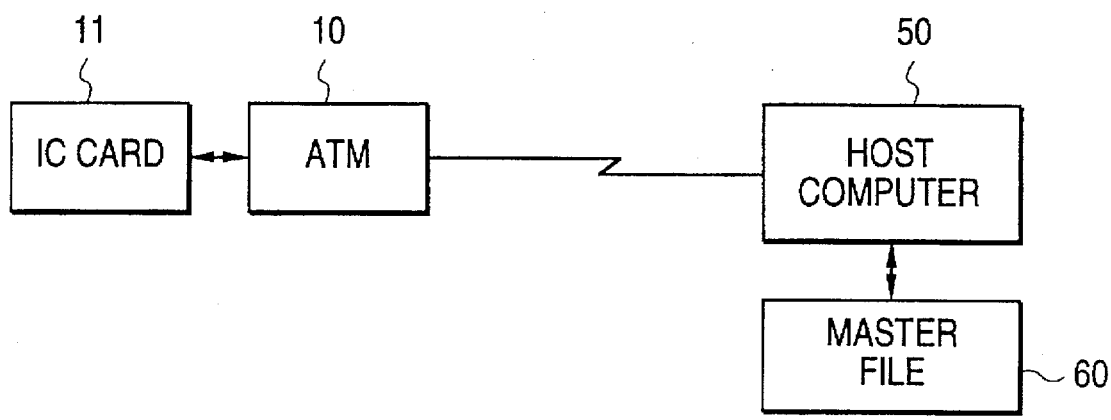
FIG. 5 is a block diagram of a bank system using the embodiment.

FIG. 5 shows block diagram of a bank system using the ATM. In FIG. 5 and FIG. 4, the IC card shown in FIG. 4 is inserted into an ATM 40 to execute a transaction. The transaction is, for example, to place money on deposit with the bank or to draw on a bank deposit. If the transaction is executed by the user at the ATM 40, deposit data of the user, such as the fund, balance, the type of the transaction, which are stored in the RAM 23 of the IC card 11, are read by the CPU 21 and transferred to the ATM 40 through the external contact 15. Then, the ATM 40 transmits the data to a host compouter 50. The host computer 50 calculates updated data by using the transmittted data and stores the updated data with respect to the user in a master file 60.

Then, the updated data is transmitted to the ATM 40 from the host computer 50, and transferred to the IC card 11. The IC card 11 receives the updated data from the external contact 15 and stores the data in the RAM 23 under the control of the CPU 21.

Figure 6:
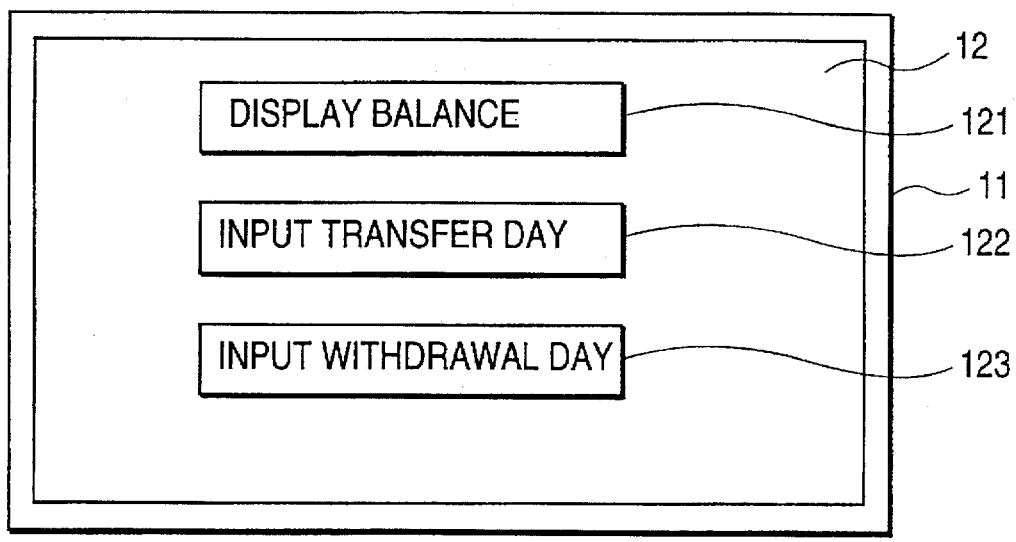
FIG. 6 is a view of the front face of the embodiment when MENU button is depressed.

When the MENU button in the keyboard display 12 (FIG. 3(A)) is operated by the user, the CPU 21 controls the LCD driver 26 to display a control menu on the LCD 27 as shown in FIG. 6. If a panel button 121 displaying "DISPLAY BALANCE" is on, the CPU 21 reads data stored in the RAM 23 and edits the data according to a program stored in the ROM 22 so as to generate balance data, and then, the CPU 21 controls the LCD driver 26 to display the balance data on the LCD driver 26 to display the balance data on the LCD 27 as balance information. The balance information includes the deposit or reception date, withdrawn or deposited amount of money, and balance.

Under the condition displaying the picture shown in FIG. 6, if a panel button 122 displaying "INPUT TRANSFER DAY" is on, CPU 21 controls the LCD driver 26 to display a picture for inputting the transfer day. When the user inputs the transfer day in the touch panel 25 of the picture, it is stored in the RAM 23 as time data for the transfer. If a panel button 123 displaying "INPUT WITHDRAWAL DAY" is on (=depressed), the CPU 21 controls the LCD driver 26 to display a picture for inputting the withdrawal day. When the user inputs the withdrawal day in the touch panel 25, it is stored in the RAM 23 as time data of the withdrawal. The CPU 21 counts the time day by day, and the present count time (day) equals to the transfer day or withdrawal day stored in the RAM 23. The CPU 21 generates a first or a second flag with respect to the transfer day or the withdrawal day and stores the flag in the RAM 23.

When the one-touch key VOICE 14 shown in FIG. 3(A) is depressed, the CPU 21 checks the first and second flags. If the first flag is detected from the RAM 23, the CPU 21 controls the voice driver 35 to notify the user concerning the necessity for a transfer or payment to the bank. The notification is obtained from the voice outputting element 13 through the voice driver 35. Also, if the second flag is detected from the RAM 23, the CPU 21 controls the voice driver 35 to notify the the user concerning the necessity for a withdrawal.

Furthermore, when the one-touch key VOICE 14 shown in FIG. 3(A) is depressed, the CPU 21 reads the balance stored in the RAM 23 and compares the balance with a predetermined amount of money, for example 100 dollars. If the balance is smaller than the predetermined amount, the CPU 21 controls the voice driver 35 to notify the user concerning the necessity for a payment (deposit) to the bank.

With the IC card according to the present invention, notification by voice announcement of the necessity for transfer or payment can be obtained from voice outputting element 13 through voice driver 35 by depressing one-touch key VOICE 14.

Further, when transfer is required or automatic withdrawal is performed periodically on a fixed day every month, this information can be registered in advance by means of touch panel 25. Further, it is also possible to perform comparison with updated data and receive, through voice outputting element 13, a voice notification that payment is required because funds are short.

As described above, according to the present invention, since an IC card having display and input functions is constructed so as to obtain a notification by voice, it is possible not only to retrieve and display detailed data as in a conventional IC card but also to receive an appropriate notification by voice just by the user of the card depressing a one-touch key. Consequently, the IC card is advantageous in that the user of the card is reminded of scheduled operations which are registered into the card through an ATM without cumbersome operation of keys. This improves the operability and the convenience of the IC card greatly.

Further, according to the present invention, since an IC card has a keyboard display provided on one side and has a voice outputting element for outputting a notification by voice provided on the other side, an increase in the thickness of the IC card is avoided. Consequently, the IC card is improved in operability while keeping a small size and light weight.

Furthermore, according to the present invention, since a voice notification key for controlling the notification by voice by one-touch is provided on the keyboard display, the user of the card can receive the notification by voice readily without missing a scheduled operation through an ATM. Thus, the IC card of the present invention provides facility of operation.

What is claimed is:

1. An IC card comprising:
   an interface for connection to an external device for receiving transaction data including balance data corresponding to a transaction of a bank from said external device;
   memory means for storing said transaction data;
   input means for inputting a transfer day and a withdrawal day;
   a one-touch key;
   voice output means for outputting a voice in response to said one-touch key; and control means for controlling said memory means, said input means and said voice output means, said control means storing said transfer day and said withdrawal day from said input means in said memory means, generating first flag data when a time equals said transfer day, generating second flag data when said time equals said withdrawal day, controlling said voice output means in response to operation of said one-touch key and said first flag data to output a voice for announcing the necessity for a transfer, controlling said voice output means in response to operation of said one-touch key and said second flag data to output a voice for announcing the necessity for a withdrawal, and controlling said voice output means in response to operation of said one-touch key to output a voice for announcing that a balance is short when said balance data stored in said memory means are short.

2. An IC card as claimed in claim 1, wherein said IC card further has a keyboard display on a first face and a voice outputting element for outputting a notification by the voice a second face.

3. An IC card as claimed in claim 2, wherein said IC card has, on the first face, a voice notification key which activates the notification by voice when the key is depressed.

4. An IC card as claimed in claim 1, further comprising means for providing audio response data which are inputted by means of a keyboard for an arbitrarily designated date.

5. An IC card as claimed in claim 1, further comprising means for calculating, in response to an amount of automatic payment on a predetermined date, and outputting, when funds are short, an amount of shortage by voice.

6. The IC card as claimed in claim 1, wherein said IC card has a keyboard display on a surface of said IC card.

* * * * *